United States Patent
Schroeder et al.

(10) Patent No.: US 7,326,430 B2
(45) Date of Patent: Feb. 5, 2008

(54) METHOD OF PREPARING LIQUID COMPOSITIONS FOR DELIVERY OF N-[N- (3,3-DIMETHYLBUTYL- L-α-ASPARTYL]-L-PHENYLALANINE 1-METHYL ESTER IN FOOD AND BEVERAGE SYSTEMS

(75) Inventors: Stephen A. Schroeder, Belvidere, IL (US); Run Wang, Gurnee, IL (US); Subbaroa V. Ponakala, Elk Grove, IL (US); Vinod Chaudhary, Mcquon, WI (US)

(73) Assignee: The Nutrasweet Company, Chicago, IL (US)

( * ) Notice: Subject to any disclaimer, the term of this patent is extended or adjusted under 35 U.S.C. 154(b) by 115 days.

(21) Appl. No.: 09/903,710

(22) Filed: Jul. 13, 2001

(65) Prior Publication Data

US 2002/0090436 A1    Jul. 11, 2002

Related U.S. Application Data

(60) Provisional application No. 60/218,815, filed on Jul. 18, 2000.

(51) Int. Cl.
*A23L 1/236*    (2006.01)
(52) U.S. Cl. .................... 426/548; 426/573
(58) Field of Classification Search ........... 426/548, 426/573, 575, 576, 577, 578
See application file for complete search history.

(56) References Cited

U.S. PATENT DOCUMENTS

| | | | |
|---|---|---|---|
| 4,722,844 A | 2/1988 | Ozawa et al. | 426/3 |
| 5,480,668 A | 1/1996 | Nofre et al. | 426/548 |
| 5,510,508 A | 4/1996 | Claude et al. | 560/41 |
| 5,728,862 A | 3/1998 | Prakash | 560/40 |
| 6,129,942 A | 10/2000 | Prakash et al. | 426/548 |
| 6,146,680 A | 11/2000 | Prakash et al. | 426/548 |
| 6,180,156 B1 | 1/2001 | Prakash et al. | 426/548 |
| 6,180,157 B1 | 1/2001 | Fotos et al. | 426/548 |
| 6,214,402 B1 | 4/2001 | Fotos et al. | 426/548 |
| 6,291,004 B1 | 9/2001 | Prakash et al. | 426/548 |
| 6,331,646 B1 | 12/2001 | Schroeder et al. | 560/40 |
| 6,365,216 B1 | 4/2002 | Dron et al. | 426/548 |
| 2002/0051836 A1 | 5/2002 | Yatka et al. | 426/3 |

FOREIGN PATENT DOCUMENTS

| | | |
|---|---|---|
| WO | 99/12956 | 3/1999 |
| WO | 99/62354 | 12/1999 |
| WO | 00/15049 | 3/2000 |
| WO | 00/31118 | 6/2000 |
| WO | 00/36924 | 6/2000 |

*Primary Examiner*—Leslie Wong
(74) *Attorney, Agent, or Firm*—Fitzpatrick, Cella, Harper & Scinto

(57) ABSTRACT

This invention provides a method for preparing a liquid composition of N-[N-(3,3-dimethylbutyl)-L-α-aspartyl]-L-phenylalanine 1-methyl ester comprising the steps of (a) providing a liquid carrier; and (b) mixing N-[N-(3,3-dimethylbutyl)-L-α-aspartyl]-L-phenylalanine 1-methyl ester with said liquid carrier in a ratio of up to 3:2 by weight to produce a liquid composition. The resulting liquid composition would be capable of fully dissolving or suspending neotame and may be mixed with or added to a food or beverage product in an amount effective to sweeten the food or beverage product. This invention is also directed to the novel liquid compositions prepared by the process of this invention and to the food and beverage products sweetened thereby. The liquid carriers of this invention include water, alcohol and mixtures thereof.

10 Claims, No Drawings

US 7,326,430 B2

METHOD OF PREPARING LIQUID COMPOSITIONS FOR DELIVERY OF N-[N-(3,3-DIMETHYLBUTYL-L-α-ASPARTYL]-L-PHENYLALANINE 1-METHYL ESTER IN FOOD AND BEVERAGE SYSTEMS

This application claims the benefit of U.S. Provisional Application No. 60/218,815, filed Jul. 18, 2000.

BACKGROUND OF THE INVENTION

1. Field of the Invention

This invention relates to a method of preparing liquid compositions for delivery of N-[N-(3,3-dimethylbutyl)-L-α-aspartyl]-L-phenylalanine 1-methyl ester in food and beverage systems.

2. Related Background Art

N-[N-(3,3-dimethylbutyl)-L-α-aspartyl]-L-phenylalanine 1-methyl ester (hereinafter "neotame") is an extremely potent sweetening agent, as disclosed in U.S. Pat. No. 5,480,668, the complete disclosure of which is incorporated by reference herein. Its sweetening potency, on a weight basis, is reported to be about 6,000 to about 8,000 times that of sucrose and about forty to fifty times that of aspartame.

As with aspartame, a major application for neotame is as a low calorie sweetener in the food and beverage industries. Neotame is sold in bulk to the various food and beverage manufacturers who must then repackage the sweetener and distribute it to their various bottlers and distributors.

Neotame in bulk is commercially available in various forms: powder, granulated and agglomerated. The granular form of neotame has high bulk density and possesses good flow properties but does not always instantaneously dissolve. In contrast, neotame powder has low bulk density and good dissolution properties, yet, due to its lower bulk density and small particle size, is readily air-borne and can present dusting and flow problems. In particular, the extremely high potency of undiluted neotame renders its powder dust potentially irritating during handling and transport. These properties can result in product losses and metering problems, and create a need for expensive packaging and shipping containers as well as protective gear. The equipment expenditures used to offset these problems can substantially increase production costs of the food or beverage product sweetened with neotame.

The use of a liquid delivery system, whereby neotame is delivered via a stable liquid composition to the food or beverage system, would bring about a number of key advantages. Carbonated soft drink manufacturers would be spared inconvenience and cost by having an all liquid production system that avoids handling of solid neotame, particularly in its powder form. In addition, adjustment of the food or beverage formulation would be minimized because neotame's high potency requires less neotame to sweeten the product. A further advantage would be the relative ease of metering a liquid neotame composition as compared to a solid form. Due to neotame's extremely high potency, food and beverage manufacturers must be able to precisely meter the addition of neotame to their products.

While use of a liquid delivery system would theoretically minimize handling and metering problems as compared to a solid form, experience with other high intensity sweeteners such as aspartame, acesulfame-K, sucralose and saccharin, would suggest that the means for producing liquid compositions to deliver high intensity sweeteners is limited. Many high intensity sweeteners lack sufficient solubility in water (about 1%) and alcohols (less than 0.1% for aspartame in ethanol) and thus must be viscosified by thickening stabilizing agents such as gums or other polymers. For example, U.S. Pat. No. 4,722,844 to T. Ozawa et. al. teaches the preparation of aqueous aspartame dispersions by addition of a viscosity or specific gravity increasing component, such as food gums and polysaccharides. This reference however, discloses aqueous suspensions that must be either shaken before use, or alternatively viscosified by the addition of stabilizing agents. Moreover, this reference requires the presence of water, and further indicates that an amount of aspartame in the dispersion must be maintained in an undissolved state.

The limited solubility of aspartame and other high intensity sweeteners therefore presents the need for either a higher volume of liquid carrier or alternatively, a thickening stabilizing agent. The addition of more liquid carrier or a thickening stabilizing agent may however, adversely affect the viscosity, appearance, taste, texture or mouthfeel of the food or beverage product. Moreover, the limited solubility of high intensity sweeteners such as aspartame, sucralose, saccharin or acesulfame-K may require additional expense and labor for agitating or stirring the powder into the liquid.

It would thus be desirable to prepare a liquid composition of neotame for delivery in food and beverage systems that avoids the above problems encountered with other liquid formulations of high intensity sweeteners: the resulting liquid neotame composition would have minimal effect on the final formulation of the food or beverage product; would provide improved handling for shipping and transportation; and most significantly, would not result in any noticeable change in sweetness, appearance, taste, texture or mouthfeel to the final food product. It would be further desirable if neotame may be fully dissolved or suspended in the liquid composition to preclude the need for shaking the composition prior to delivery, or for viscosifying the liquid composition with stabilizing agents. It would also be advantageous if the liquid composition could deliver the desired amount of neotame without adding significant calories.

SUMMARY OF THE INVENTION

The present invention relates to a method of preparing liquid compositions for delivery of N-[N-(3,3-dimethylbutyl)-L-α-aspartyl]-L-phenylalanine 1-methyl ester in food and beverage systems and to the liquid compositions produced thereby. In particular, the present invention utilizes liquid carriers such as alcohol or water or mixtures thereof to dissolve or suspend neotame and thereby produce versatile, easy-to-use liquid compositions for use in the food and beverage industries.

More particularly, this invention provides a method for preparing a liquid composition of N-[N-(3,3-dimethylbutyl)-L-α-aspartyl]-L-phenylalanine 1-methyl ester comprising the steps of (a) providing a liquid carrier; and (b) mixing N-[N-(3,3-dimethylbutyl)-L-α-aspartyl]-L-phenylalanine 1-methyl ester with said liquid carrier in a ratio of up to 3:2 by weight to produce the liquid composition. The resulting liquid composition would be capable of fully dissolving or suspending neotame and may be mixed with or added to a food or beverage product in an amount effective to sweeten the food or beverage product. This invention is also directed to the novel liquid compositions prepared by the process of this invention and to the food and beverage products sweetened thereby.

DETAILED DESCRIPTION OF THE INVENTION

N-[N-(3,3-dimethylbutyl)-L-α-aspartyl]-L-phenylalanine 1-methyl ester ("neotame") may be prepared from aspartame as described in U.S. Pat. No. 5,480,668, U.S. Pat. No. 5,510,508, and U.S. Pat. No. 5,728,862, all of which are incorporated by reference herein.

Salt and metal complexes of neotame, which may be used in the present invention, are disclosed in U.S. patent application Ser. No. 09/146,963, now U.S. Pat. No. 6,291,004) U.S. patent application Ser. No. 09/146,964, now U.S. Pat. No. 6,180,156, U.S. patent application Ser. No. 09/148,134, now U.S. Pat. No. 6,129,942, and U.S. patent application Ser. No. 09/146,965, now U.S Pat. No. 6,146,680 all filed Sep. 4, 1998, and all of which are incorporated by reference herein. Other exemplary forms of neotame that may be useful in this invention include neotame complexes such as those disclosed in PCT Publication No. US99/21471, filed Sep. 17, 1999, co-crystallized neotame disclosed in U.S. patent application Ser. No. 09/154,568, now U.S. Pat. No. 6,214,402, filed Sep. 17, 1998, or the novel crystalline form disclosed in U.S. patent application Ser. No. 09/518,362, now abandoned filed Mar. 3, 2000 all of which are incorporated by reference herein. Other forms of neotame which may be used are the particles and extrudates disclosed in U.S. Provisional Patent Application No. 60/126,363, filed Mar. 26, 1999, and the compacted form disclosed in U.S. Provisional Patent Application No. 60/182,908, filed on Feb. 16, 2000, both of which are incorporated by reference herein. One skilled in the art will understand that these exemplary forms of neotame are non-limiting, and may further include, for example, neotame modified by granulation or produced by processes resulting in different crystal forms.

The present invention is directed to a method for preparing a neotame liquid composition which has a neotame concentration ranging up to 150% (150 g neotame per 100 g solvent) and which provides greater ease in handling over bulk neotame crystalline powder. The method of this invention comprises the steps of (a) providing a liquid carrier; and (b) mixing neotame with said liquid carrier in a ratio of up to 3:2 by weight to produce a liquid composition. Preferably the neotame is mixed until it is fully dissolved or suspended in the liquid carrier. No further processing of the liquid composition such as spraying, drying or heating is required.

Preferably the neotame is mixed in with the liquid carrier at a temperature in the range of between about −20° C. to about 30° C., and most preferably at a temperature in the range of about −10° C. to about 10° C., but no temperature modification is required. As used herein, the term "mixing" means blending sufficiently so as to form a mixture. Preferably neotame is mixed with the liquid carrier until it is fully dissolved or suspended to form the liquid composition.

The liquid carrier of the composition preferably comprises water, alcohol, or mixtures thereof. Where water is present, the liquid carrier may also optionally comprise a suspending agent. Where alcohol is present, the liquid carrier may also optionally comprise a food-grade oil. In one preferred embodiment, the liquid carrier is a food-grade alcohol such as ethanol, polypropylene glycol and its derivatives, or mixtures thereof. Most preferably, the food-grade alcohol is ethanol.

While the solubility of aspartame and other high intensity sweeteners in ethanol is very low, the concentration of neotame that can be solubilized in ethanol is surprisingly large, up to 150% or 150 g of neotame per 100 g ethanol. Preferably, the concentration of neotame in ethanol solutions will be between about 50% and about 125%, more preferably between about 80% and about 110% by relative weight.

When ethanol is used as the liquid carrier, the available range of concentrations of neotame is very broad, which permits flexibility in formulating the final food or beverage product. Moreover, because only small amounts of ethanol are required to carry the neotame, the small quantity of ethanol has no noticeable effect on the food or beverage product's appearance, taste, texture or mouthfeel. In addition, the ethanol/neotame liquid composition will result in faster distribution throughout the food system as compared to a solid neotame composition.

The solubility of the neotame in ethanol has made the ethanol/neotame liquid composition uniquely suited for preparing a number of neotame compositions, particularly for preparing agglomerated forms of neotame such as those disclosed in U.S. patent application Ser. No. 09/252,072, filed Feb. 18, 1999, the disclosure of which is incorporated by reference herein. One of the steps in the neotame agglomeration process involves the spraying and heating of a premix ethanol/neotame liquid composition onto fluidized carrier particles.

The liquid neotame composition permits great flexibility in formulating delivery to the food or beverage system. The concentration of neotame in the liquid composition may vary widely depending upon the particular liquid carrier used, the amount of the liquid carrier or the desired level of neotame in the liquid composition. Where a high level of neotame in the food or beverage product is desired, the ratio of neotame relative to liquid carrier can be adjusted by increasing the quantity of neotame or decreasing the quantity of the liquid carrier. Conversely, a low level of neotame can be achieved by reducing the quantity of neotame or increasing the quantity of liquid carrier. In each embodiment, the neotame is fully dissolved or suspended in the liquid composition. The available range of concentration of neotame in the liquid composition will, of course, depend upon the solubility of neotame in the particular liquid carrier chosen.

In addition, when alcohol is present in the liquid composition, a food-grade oil may be added to the composition without disrupting the solubility of neotame. The food grade oil may be any oil well-known in the art, but is preferably selected from the group consisting of corn oil, olive oil, soybean oil, safflower oil, peanut oil, canola oil and sunflower oil. Preferably, the oil is incorporated in an amount in the range of about 0.001% to about 0.5% of the total weight of the composition.

In another preferred embodiment of this invention, the liquid carrier is free of alcohol and comprises water and a suspending agent selected from the group consisting of a food grade polymer, a hydrocolloid or gum such as carboxymethyl cellulose (CMC), algin, gum arabic, carrageenan, xanthan gum, guar gum, tragancanth, hydroxypropyl methyl cellulose (HPMC), methylcellulose, pectin, locust bean gum, sodium alginate, propylene glycol alginate, caramel and mixtures thereof. Preferably, the suspending agent of this embodiment is CMC, xanthan gum, tragacanth or carrageenan. Multiple suspending agents may be incorporated into the liquid carrier. Trace amounts of an emulsifier or wetting agent such as polysorbate (polyoxyethylene fatty acid ester) or lecithin may also be incorporated to improve the suspensions' dissolution and stability characteristics. The food polymers, emulsifiers, hydrocolloids or gums may be effectively incorporated in the compositions in amounts of from 0.001% to about 0.5% of the total weight of the composition.

In yet another preferred embodiment of this invention, the liquid carrier comprises a mixture of water and alcohol and optionally, a suspending agent selected from the group consisting of vegetable proteins. The vegetable protein may be effectively incorporated in the liquid composition in amounts of from 0.001% to about 0.5% of the total weight of the composition. Most preferably, the protein is zein (corn protein). It has surprisingly been discovered that zein provides extremely stable suspension properties to mixtures comprised of neotame, ethanol and water, whereas the non-protein suspending agents will fall out of the solution when alcohol is present.

Although neotame powder is sparingly soluble in water, it is possible to make a liquid composition of neotame in water by itself. For example, compositions of up to 30% of neotame suspended in water can be made. Nonetheless, the addition of the suspending agent of the present invention in a trace amount (approximately 0.5%) during the formation of the suspension renders it much more suitable for fluid processing for the food and beverage industry.

The addition of suspending agents to an aqueous suspension of neotame considerably increases the capacity for neotame in the suspension. When mixed with a liquid carrier comprising a suspending agent, neotame levels varying from approximately 1% to about 70% by weight of the total weight of the suspension are achievable. Preferably, said neotame is incorporated in amounts of from about 20% to about 55% by weight and most preferably in an amount of from about 20% to about 35% by weight of the total suspension.

The resulting liquid composition comprising neotame and the liquid carrier may be mixed with or added to a variety of food or beverage products, including drinks, foods, confectionary, pastries, chewing gums, hygiene products and toiletries, as well as cosmetic, pharmaceutical and veterinary products. Its superior sweetening potency makes neotame an attractive alternative to aspartame because it permits the use of neotame in substantially smaller quantities than is required for aspartame to achieve an equivalent sweetening effect.

Another advantageous aspect of the present invention is that when the liquid composition comprises water, it may be mixed with blending agents prior to mixing in the food or beverage product. As used herein, the term blending agents include a broad range of ingredients commonly used in foods or beverages including, but not limited to, those used herein as binding agents, carriers, bulking agents, and sweeteners. Exemplary blending agents that may be blended with neotame include aspartame, acesfulame and its salts, sucralose, saccharin, alitame, cyclamates, stevia derivatives, thaumatin, sucrose, fructose, dextrose, polyol sugar alcohols, citric acid, dextrin, maltodextrin, dextrose-maltodextrin blends, lactose insulin, erthritol, sorbitol, stevioside, hydroxpropylmethyl cellulose, carboxymethyl cellulose, polyvinylpyrrolidone, proteins, vitamines and mixtures thereof.

When the liquid composition comprises alcohol, other soluble adjuvants may be added prior to mixing the liquid composition to the food or beverage product. Any soluble adjuvant which enhances the temporal properties of the liquid composition may be used. Adjuvants which may be added include glycerin and flavors.

The examples which follow are intended to illustrate certain preferred embodiments of the invention, and no limitation of the invention is implied.

EXAMPLE 1

Preparation of Liquid Composition Comprising N-[N-(3,3-dimethylbutyl)-L-α-aspartyl]-L-phenylalanine 1-methyl ester and Ethanol for Delivery in Kool-Aid® Punch A liquid composition comprising neotame was prepared by mixing 150 g of neotame in 100 g of ethanol; 0.1331 g (20 ppm) of the neotame/ethanol composition was then added to 4 liters of water and mixed with two packages of Kool-Aid® Punch.

The Kool-Aid Punch beverage was acceptably sweet.

EXAMPLE 2

Preparation of Liquid Composition Comprising N-[N-(3,3-dimethylbutyl)-L-α-aspartyl]-L-phenylalanine 1-methyl ester, Water, Alcohol and Zein Suspending Agent A liquid composition was prepared by mixing 50 g of neotame, 25 g water, 25 g ethanol, and 0.1 g of zein.

EXAMPLE 3

Preparation of Liquid Composition Comprising N-[N-(3,3-dimethylbutyl)-L-α-aspartyl]-L-phenylalanine 1-methyl ester, Water and a Gum Suspending Flow Agent A liquid composition was prepared by mixing 30 g of neotame and 0.3 g of CMC in 100 g of water.

EXAMPLE 4

Preparation of Liquid Composition Comprising N-[N-(3,3-dimethylbutyl)-L-α-aspartyl]-L-phenylalanine 1-methyl ester and Ethanol for Delivery in Chocolate Cake A liquid composition comprising neotame was prepared by mixing 150 g of neotame in 100 g of ethanol.

The quantities of ingredients are shown in Table 1 below. An emulsifier comprising polypropylene glycol and mono- and di-esters of fat was first blended together with shortening at medium speed. Neotame was mixed in manually, then at low speed, and then at medium speed, followed by addition of all dry ingredients while continuously blending. After thorough blending of all dry ingredients, the eggs and 66.4 g of water were added and the mixture was further blended. The remaining portion of water was added during continuous mixing. 425 g of the resulting mixture was transferred to an eight inch round pan and baked at 350° F. for 30 minutes.

The chocolate cake provided acceptable taste and sweetness on par with chocolate cake made with a crystalline form of neotame.

TABLE 1

Chocolate Cake Prepared by Mixing with Liquid Neotame Composition.

| Ingredient | Weight (g) |
| --- | --- |
| Liquid Neotame Composition | 0.1040 |
| Shortening | 0.0624 |
| EC-25 Emulsifier | 1.0002 |
| Polydextrose | 29.01 |
| Maltrin −180 | 58.08 |
| Sorbitol | 29.01 |
| Base Mix: | 149 |
| Cake flour (21.26%) | |
| Non-fat dry milk (1.07%) | |
| Xanthan gum (0.1%) | |
| Instant Cleargel (0.98%) | |
| Mono calcium phosphate (0.09%) | |
| Sodium acid pyrophosphate (0.21%) | |
| Vanillin (0.1%) | |
| Cocoa (5.53%) | |
| Baking Soda | 3.25 |
| Water | 127 |
| Eggs | 60 |

Other variations and modifications of this invention will be obvious to those skilled in the art. This invention is not limited except as set forth in the claims.

What is claimed is:

1. A method for preparing an alcohol-free liquid composition of N-[N-(3,3-dimethylbutyl)-L-α-aspartyl]-L-phenylalanine 1-methyl ester comprising the steps of:
   (a) providing an alcohol-free liquid carrier consisting of water and a suspending agent selected from the group consisting of carboxymethyl cellulose, algin, gum arabic, carrageenan, xanthan gum, guar gum, tragancanth, hydroxypropyl methyl cellulose, methylcellulose, pectin, locust bean gum, sodium alginate, propylene glycol alginate, caramel and mixtures thereof; and
   (b) mixing N-[N-(3,3-dimethylbutyl)-L-α-aspartyl]-L-phenylalanine 1-methyl ester with said alcohol-free liquid carrier, said alcohol-free liquid carrier consisting of water and a suspending agent selected from the group consisting of carboxymethyl cellulose, algin, gum arabic, carrageenan, xanthan gum, guar gum, tragancanth, hydroxypropyl methyl cellulose, methylcellulose, pectin, locust bean gum, sodium alginate, propylene glycol alginate, caramel and mixtures thereof, in a ratio of up to 3:2 to produce an alcohol-free liquid composition;
   wherein the N-[N-(3,3-dimethylbutyl)-L-α-aspartyl]-L-phenylalanine 1-methyl ester is mixed until fully dissolved or suspended.

2. The method according to claim 1, wherein the suspending agent is selected from the group consisting carboxymethyl cellulose, carrageenan, xanthan gum or tragancanth.

3. The method according to claim 1, wherein the suspending agent may be effectively incorporated in the liquid composition in amounts of from 0.001% to about 0.5% of the total weight of the composition.

4. The method according to claim 1, wherein neotame is present in an amount of 1% to 70% by weight of the liquid composition.

5. The method according to claim 4, wherein neotame is present in an amount of 20% to 55% by weight of the liquid composition.

6. The method according to claim 5, wherein neotame is present in an amount of 20% to 35% by weight of the liquid composition.

7. The method according to claim 1, wherein the N-[N-(3,3-dimethylbutyl)-L-α-aspartyl]-L-phenylalanine 1-methyl ester is mixed with said liquid carrier at a temperature in the range of about −20° C. to about 30° C.

8. The method according to claim 7, wherein the N-[N-(3,3-dimethylbutyl)-L-α-aspartyl]-L-phenylalanine 1-methyl ester is mixed with said liquid carrier at a temperature in the range of about −10° C. to about 10° C.

9. The liquid composition produced according to the method of claim 1.

10. A method for preparing an alcohol-free liquid composition of N-[N-(3,3-dimethylbutyl)-L-α-aspartyl]-L-phenylalanine 1-methyl ester comprising the step of:
   mixing 30% by weight of N-[N-(3,3-dimethylbutyl)-L-α-aspartyl]-L-phenylalanine 1-methyl ester with an alcohol-free liquid carrier consisting of water; wherein the N-[N-(3,3-dimethylbutyl)-L-α-aspartyl]-L-phenylalanine 1-methyl ester is mixed until fully dissolved or suspended.

* * * * *

UNITED STATES PATENT AND TRADEMARK OFFICE
CERTIFICATE OF CORRECTION

PATENT NO. : 7,326,430 B2
APPLICATION NO. : 09/903710
DATED : February 5, 2008
INVENTOR(S) : Stephen A. Schroeder et al.

It is certified that error appears in the above-identified patent and that said Letters Patent is hereby corrected as shown below:

<u>COLUMN 4</u>:

Line 57, "tragancanth," should read --tragacanth,--.

<u>COLUMN 5</u>:

Line 51, "include" should read --includes--.

<u>COLUMN 7</u>:

Line 34, "tragancanth," should read --tragacanth,--; and
Line 44, "tragancanth," should read --tragacanth,--.

<u>COLUMN 8</u>:

Line 9, "consisting" should read --consisting of--; and
Line 10, "tragancanth." should read --tragacanth.--;

Signed and Sealed this

Twenty-second Day of July, 2008

JON W. DUDAS
*Director of the United States Patent and Trademark Office*